United States Patent
Asai et al.

(10) Patent No.: US 10,564,513 B2
(45) Date of Patent: Feb. 18, 2020

(54) OPTICAL WAVEGUIDE DEVICES

(71) Applicant: NGK INSULATORS, LTD., Aichi-prefecture (JP)

(72) Inventors: Keiichiro Asai, Nagoya (JP); Shoichiro Yamaguchi, Ichinomiya (JP)

(73) Assignee: NGK INSULATORS, LTD., Aichi-prefecture (JP)

( * ) Notice: Subject to any disclaimer, the term of this patent is extended or adjusted under 35 U.S.C. 154(b) by 457 days.

(21) Appl. No.: 14/534,373

(22) Filed: Nov. 6, 2014

(65) Prior Publication Data

US 2015/0147038 A1 May 28, 2015

(30) Foreign Application Priority Data

Nov. 28, 2013 (JP) .................................. 2013-245782

(51) Int. Cl.
| | |
|---|---|
| *G02F 1/35* | (2006.01) |
| *G02B 6/122* | (2006.01) |
| *G02B 1/10* | (2015.01) |
| *G02B 6/12* | (2006.01) |
| *G02B 6/125* | (2006.01) |

(52) U.S. Cl.
CPC ........... *G02F 1/3501* (2013.01); *G02B 6/122* (2013.01); *G02B 1/10* (2013.01); *G02B 6/125* (2013.01); *G02B 2006/12176* (2013.01); *G02F 2001/3503* (2013.01)

(58) Field of Classification Search
CPC ............ G02B 6/126; G02B 2006/1204; G02B 2006/12097
See application file for complete search history.

(56) References Cited

U.S. PATENT DOCUMENTS 3,874,782 A * 4/1975 Schmidt .................. G02F 1/011
  385/7
6,631,231 B2 10/2003 Mizuuchi et al.
(Continued)

FOREIGN PATENT DOCUMENTS

CN  1916673 A  2/2007
CN  101097275 B  12/2010
(Continued)

OTHER PUBLICATIONS

Office Action from Japanese Patent App. No. 2013-245782 (dated Nov. 2, 2015).
(Continued)

*Primary Examiner* — Sung H Pak
*Assistant Examiner* — Hoang Q Tran
(74) *Attorney, Agent, or Firm* — Tomoko Nakajima; Cermak Nakajima & McGowan LLP

(57) ABSTRACT

An optical waveguide device 1 includes a thin layer 3 and a ridge portion 5 loaded on the thin layer 3. The thin layer 3 is made of an optical material selected from the group consisting of lithium niobate, lithium tantalate, lithium niobate-lithium tantalate, yttrium aluminum garnet, yttrium vanadate, gadolinium vanadate, potassium gadolinium tungstate; and potassium yttrium tungstate. The ridge portion 5 is made of tantalum pentoxide and has a trapezoid shape viewed in a cross section perpendicular to a direction of propagation of light. The ridge portion is not peeled off from the thin layer in a tape peeling test.

17 Claims, 11 Drawing Sheets

(56) References Cited

U.S. PATENT DOCUMENTS

| | | | |
|---|---|---|---|
| 7,512,303 | B2 | 3/2009 | Catching et al. |
| 7,548,678 | B2 | 6/2009 | Sugita et al. |
| 2003/0063883 | A1* | 4/2003 | Demaray et al. ............. 385/129 |
| 2003/0223722 | A1 | 12/2003 | Sugita et al. |
| 2007/0189689 | A1* | 8/2007 | Yamaguchi et al. .......... 385/129 |
| 2008/0037944 | A1 | 2/2008 | Sugita et al. |
| 2011/0243493 | A1* | 10/2011 | Kondou ................. G02B 6/126 385/11 |
| 2012/0269478 | A1* | 10/2012 | Anderson ............... G02F 1/295 385/3 |
| 2013/0287340 | A1 | 10/2013 | Huang |
| 2014/0004638 | A1* | 1/2014 | Rabiei ............................. 438/31 |

FOREIGN PATENT DOCUMENTS

| | | | |
|---|---|---|---|
| JP | 2002-250949 | A | 9/2002 |
| JP | 2003-131182 | A | 5/2003 |
| JP | 2008-180997 | A | 8/2008 |
| JP | 2012-078375 | A | 4/2012 |
| TW | 201344265 | A | 11/2013 |

OTHER PUBLICATIONS

Rabiei, P., et al., "Heterogeneous lithium niobate photonics on silicon substrates," Optics Express 2013;21(21):9 pp.

Office Action from Chinese Patent App. No. 201410705957.6 (dated Aug. 22, 2018).

Office Action from Taiwan Patent App. No. 103140004 (dated Feb. 6, 2018).

\* cited by examiner

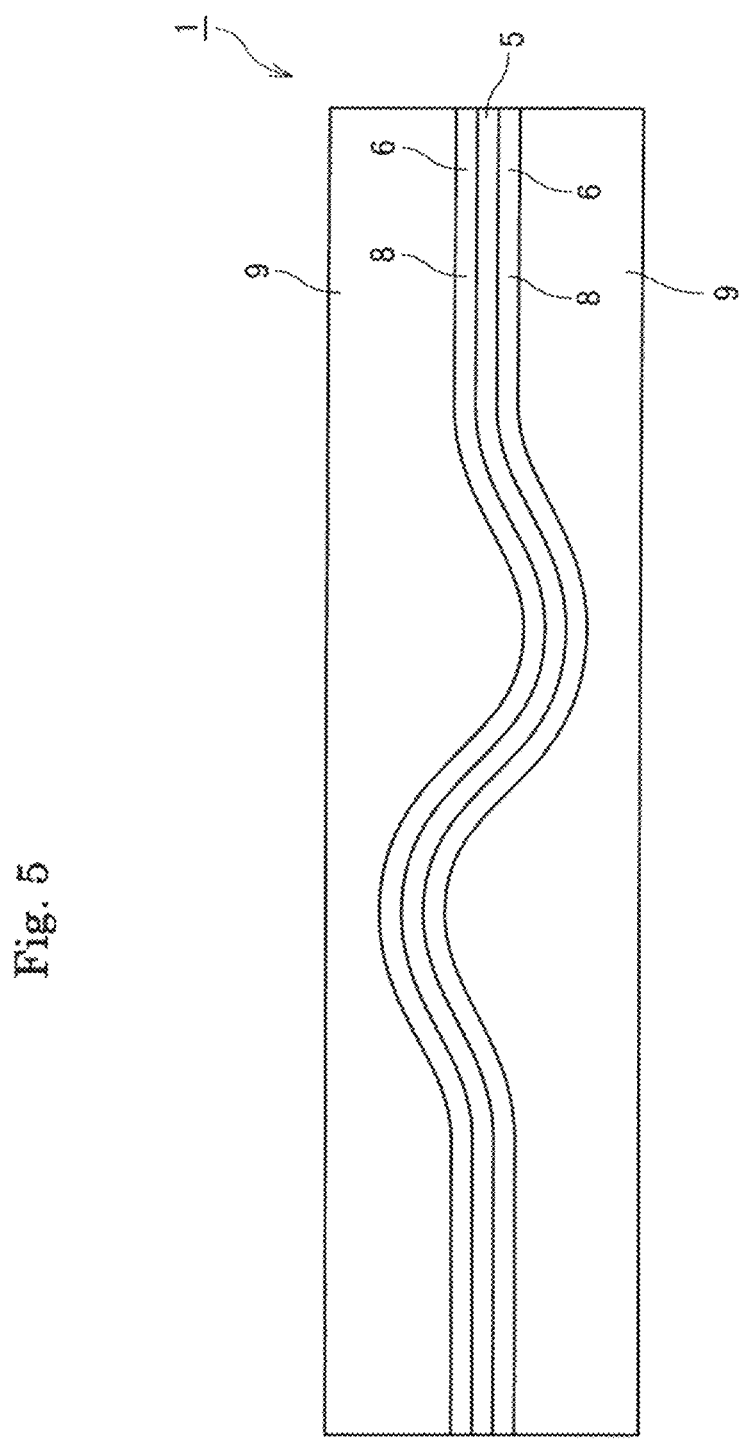

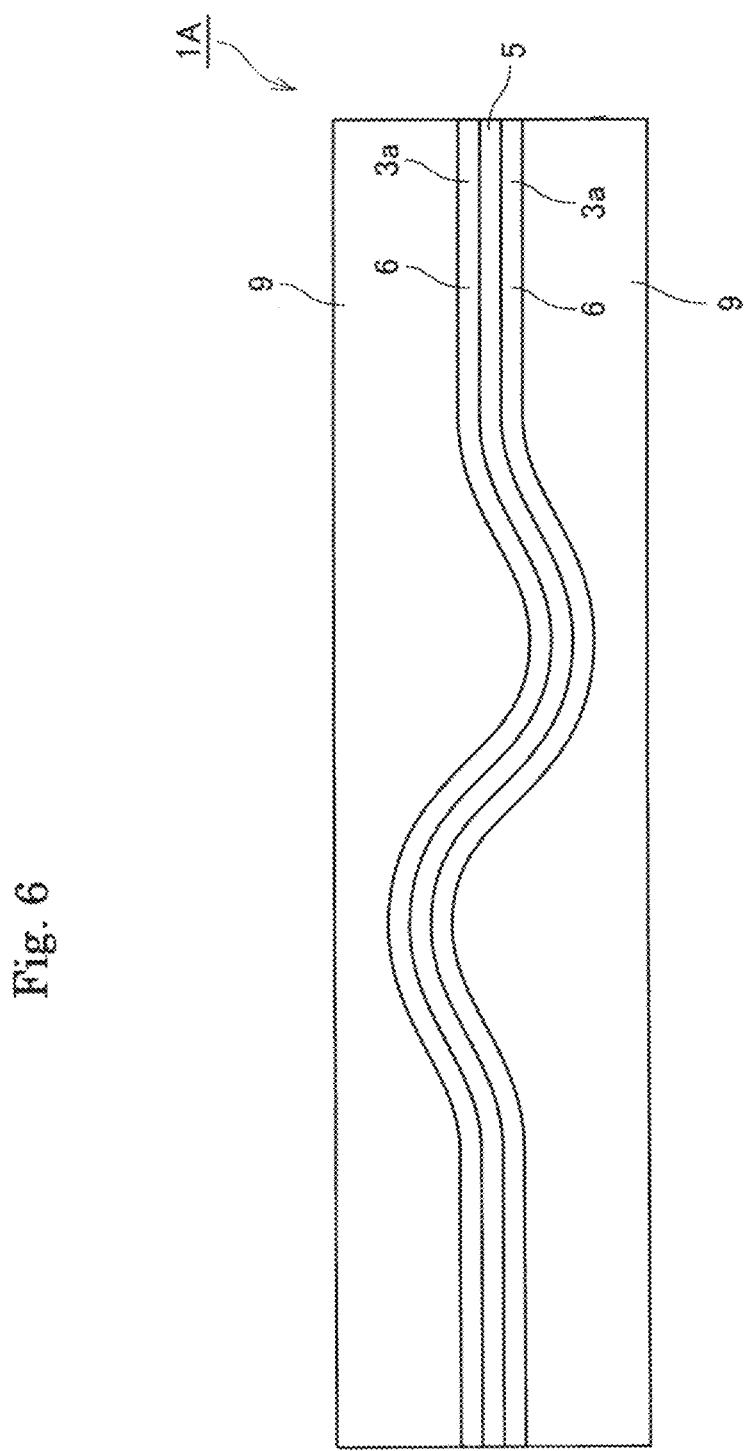

OPTICAL WAVEGUIDE DEVICES

This application claims the benefit of Japanese Patent Application No. P2013-245782 filed on Nov. 28, 2013, the entirety of which is incorporated by reference.

TECHNICAL FIELD

The present invention relates to optical waveguide devices.

BACKGROUND ARTS

Nonlinear optical crystal such as lithium niobate or lithium tantalate single crystal has a high secondary nonlinear optical constant. When a periodic domain polarization inversion structure is formed in the above crystals, a second-harmonic-generation (SHG) device of a quasi-phase-matched (QPM) system can be realized. Further, when a waveguide is formed within this periodic domain inversion structure, the high-efficiency SHG device can be realized and further, applied to optical communication, medical science, photochemistry, various optical measurements over a wide range.

Conventionally, it is required a light source of fundamental wave called exiting light from the outside of an SHG device. For example, in the case of an SHG laser oscillating green light, as the light source of the fundamental wave, it may be used a solid laser oscillating light having a wavelength of 1064 nm obtained by combining a semiconductor laser of 800 nm band with a laser crystal such as yttrium vanadate ($YVO_4$) for example. Such crystal material for laser oscillation includes, in addition to $YVO_4$, yttrium aluminum garnet (YAG), gadolinium vanadate ($GdVO_4$), potassium gadolinium tungstate (KGW), potassium yttrium tungstate (KYW) or the like.

For improving the efficiency of the SHG laser, it is effective to process the laser crystal into an waveguide in addition to the SHG device.

However, as the crystal for the SHG device and laser crystal are materials hard to be processed, it is difficult to form the optical waveguide having a low light propagation loss by the processing. For example, in the case of mechanical processing, the materials are susceptible to tipping, resulting in a cause of propagation loss. Further, in the case of laser ablation, the improvement of the productivity is limited, and further, tipping occurs at corners of the optical waveguide, and side faces and processed bottom face are roughened, as the processing rate is improved. The propagation property of the waveguide is thereby deteriorated.

Further, in the case that a wavelength converting device and optical modulation device is designed, it may be required to make the route of the optical waveguide curved, warped or branched. However, according to the mechanical processing or laser ablation, it is difficult to move a stage for processing in a direction perpendicular to the travelling direction. Further, even if the stage for the processing is travelled in the crossing direction, different from the case that the processing is performed as the stage is travelled straightforwardly, it is proved that the cross sectional shape of the ridge groove is deformed to result in an increase of the propagation loss.

On the other hand, according to Patent document 1, it is disclosed that stripes of a dielectric material are loaded on a thin layer of potassium niobate by lift-off process to form a channel and loaded type optical waveguide. According to such loaded type optical waveguide, it is possible to make the travelling direction of the optical waveguide curved and branched.

PRIOR ARTS

Patent document 1) Japanese Patent Publication No. 2003-131,182A

SUMMARY OF THE INVENTION

The inventors have studied the loaded type optical waveguide described in the patent Document 1, and found the following problems. That is, the inventors tried load a ridge portion of tantalum pentoxide on a thin layer of lithium tantalate, for example, to provide a loaded type channel optical waveguide. However, the loaded ridge portion was susceptible to separation from the thin layer so that the production yield was lowered.

As the inventors have studied the cause of the increase of propagation loss, it was proved that the adhesion of the loaded ridge portion and thin layer was poor. As the ridge portion formed by lift-off process is composed of a vapor deposition film, it is considered that the adhesion to the surface of the thin layer becomes poor. The reason is considered as follows. The ridge portion is relatively thick and a long time is required for completing the deposition, so that the temperature at a surface of a substrate becomes as high as about 150° C. during the deposition of a resist pattern. The components of the resist pattern are thus evaporated so that impurities are introduced into an interface of the ridge portion and substrate and the inside of the ridge portion.

Further, the ridge portion loaded in the patent document 1 is rectangular in a cross sectional view. This is because the resist pattern cannot be shaped into trapezoidal shape. Then, as the ridge portion was actually shaped, the upper corners of the ridge portion tend to be protruded and the side wall faces of the ridge portion tend to be roughened. The reason is considered as follows. That is, the shape of the resist pattern was deformed due to the heat, as described above, to result in the protrusion at the upper corners of the rectangular shape and the roughened side wall faces of the ridge portion.

An object of the present invention is, in a specific loaded-type optical waveguide device in which design of an ridge-type optical waveguide is relatively easy, to provide an optical waveguide device so that a shape of the optical waveguide can be designed relatively freely and a low optical propagation loss can be obtained.

The present invention provides an optical waveguide device comprising:

a thin layer comprising an optical material selected from the group consisting of lithium niobate, lithium tantalate, lithium niobate-lithium tantalate, yttrium aluminum garnet, yttrium vanadate, gadolinium vanadate, potassium gadolinium tungstate and potassium yttrium tungstate; and a ridge portion loaded on said thin layer, said ridge portion comprising tantalum pentoxide and having a trapezoidal shape viewed in a cross section perpendicular to a direction of propagation of light, wherein the ridge portion is not peeled off from said thin layer in a tape peeling test.

According to the present invention, the shape of the ridge portion can be designed relatively freely, by changing a shape of a patterning mask. It is thereby possible to form a curved or branched, loaded-type optical waveguide.

Then, since the cross sectional shape of the ridge portion loaded on the thin layer is trapezoidal shape having good adhesion onto the underlying thin layer, and inclined faces of the ridge portion are not susceptible to roughening and tipping, so that it is possible to make the propagation loss lower. As the ridge portion is prevented from peeling from the thin layer, it is possible to further reduce the propagation loss in the ridge portion.

BRIEF DESCRIPTION OF THE DRAWINGS

FIG. 5 is a plan view showing an example of pattern of an optical waveguide of the optical waveguide device 1.

FIG. 6 is a plan view showing an example of pattern of an optical waveguide of the optical waveguide device 1A.

MODES FOR CARRYING OUT THE INVENTION

A waveguide structure applied in the inventive optical waveguide device is so called loaded-type optical waveguide structure. The optical waveguide of the present invention includes a thin layer made of a specific optical material forming an underlying layer on which it is loaded a ridge portion made of tantalum pentoxide having a refractive index near that of the optical material. The thus loaded ridge portion improves the confinement of light direct under the loaded ridge portion to facilitate the propagation of light.

The present invention will be further described below referring to the attached drawings.

Figure 1:
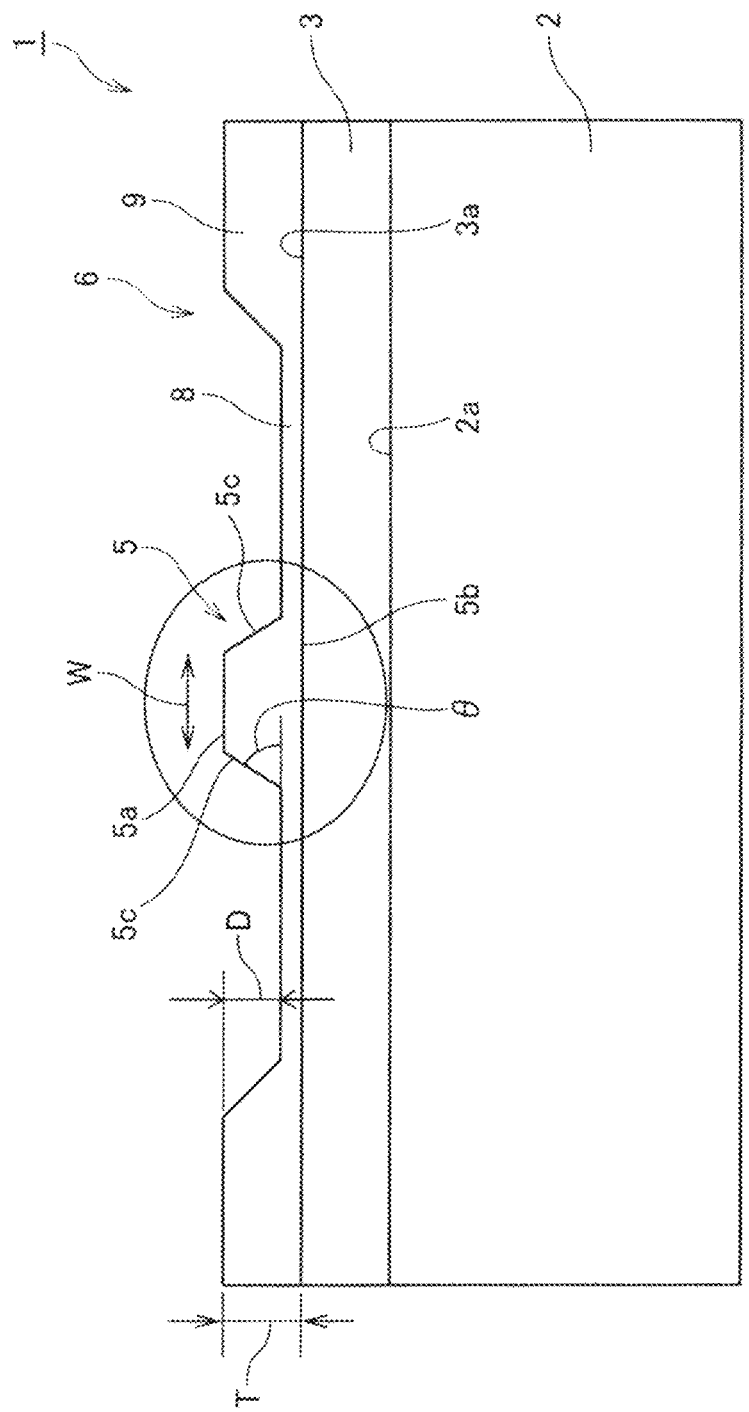
FIG. 1 is a cross sectional view showing an optical waveguide device 1 according an embodiment of the present invention.
Figure 3:
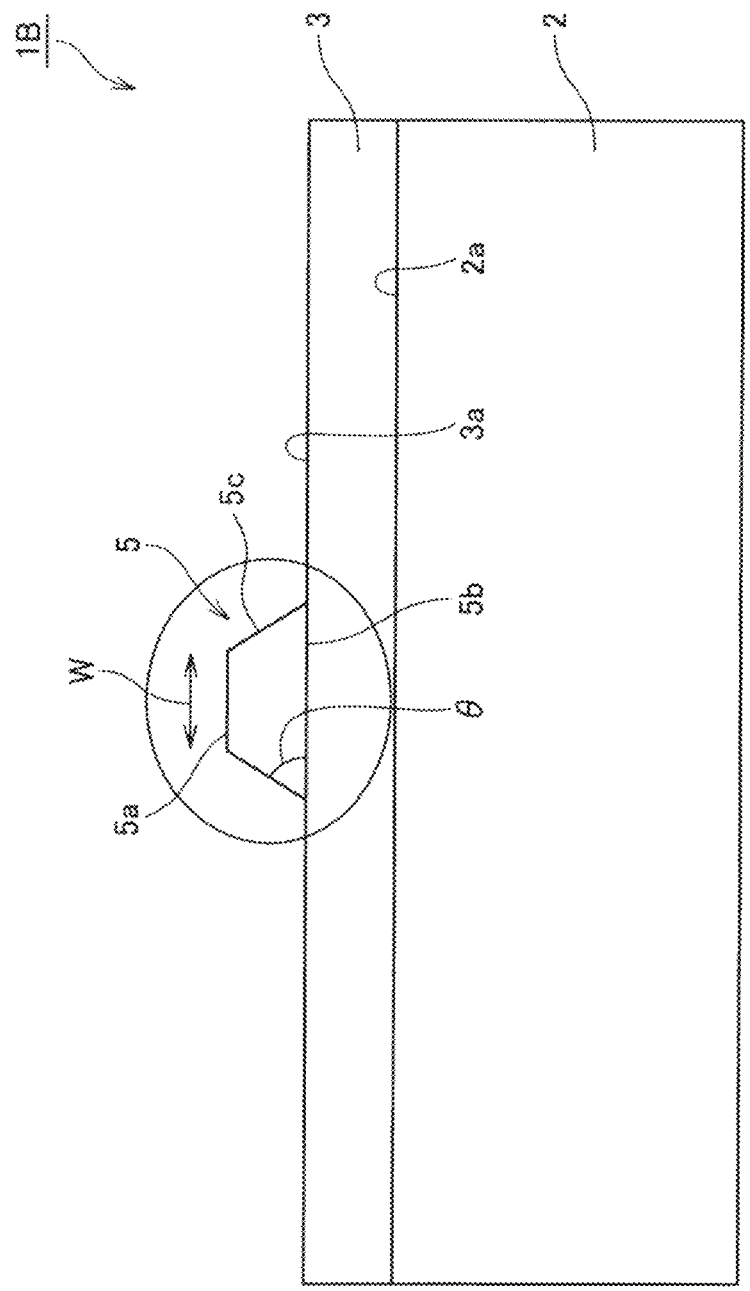
FIG. 3 is a cross sectional view showing an optical waveguide device 1B according to still another embodiment.
Figure 4A:
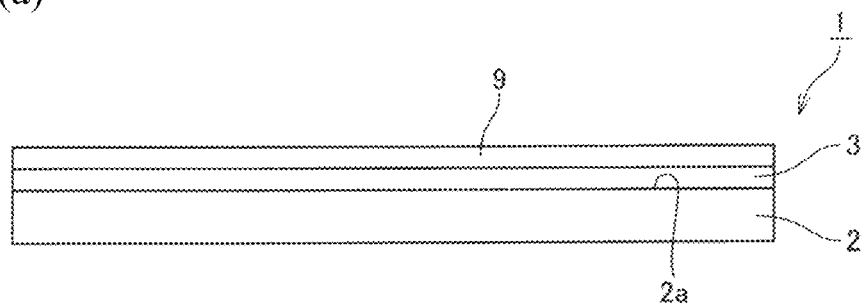
FIG. 4(a) is a side view of the optical waveguide device 1.
Figure 4B:
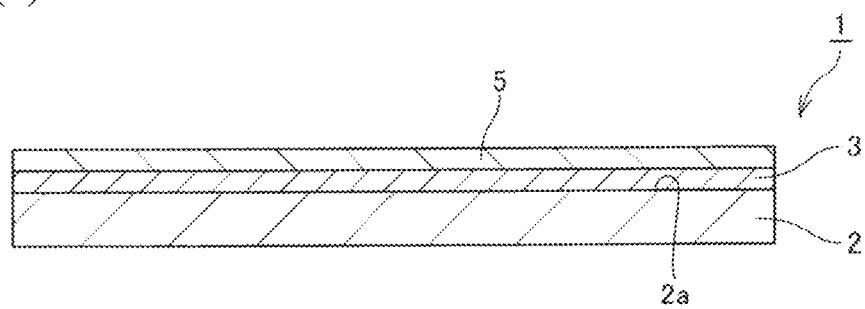
FIG. 4(b) is a longitudinal sectional view showing the optical waveguide device 1 cut along a ridge portion.

According to an optical waveguide device 1 shown in FIGS. 1, 4(a), (b) and 5, a thin layer 3 is formed on a surface 2a of a supporting body 2, and a ridge portion 5 made of tantalum pentoxide is formed on the thin layer 3. Here, FIGS. 1, 2 and 3 are cross sectional views showing the devices cut along a direction perpendicular to the propagating direction of light, respectively.

A flat upper face 5a and a pair of inclined faces 5c are formed on the ridge portion 5. According to the present example, covering portions 8 made of tantalum pentoxide are formed on both sides of the ridge portion 5, respectively, and step portions 9 are formed in the outsides of the covering portions, respectively. According to the present example, the ridge portion 5, covering portions 8 and step portions 9 are formed of an integrated film. Then, the ridge grooves 6 are formed by wet etching, and the covering portions 8 are formed by remaining parts left after the wet etching. Besides, although the covering portions 8 may not be provided, the peeling strength can be improved by providing the covering portions 8, which is preferable.

FIG. 5 is a plan view of the optical waveguide device 1. That is, the ridge grooves 6 are formed on both sides of the ridge portion 5, and the step portions 9 are formed on both sides of the ridge grooves 6, respectively. As the ridge grooves and ridge portion are formed by wet etching, it is easy to make them curved or branched as shown in FIG. 5.

Figure 2:
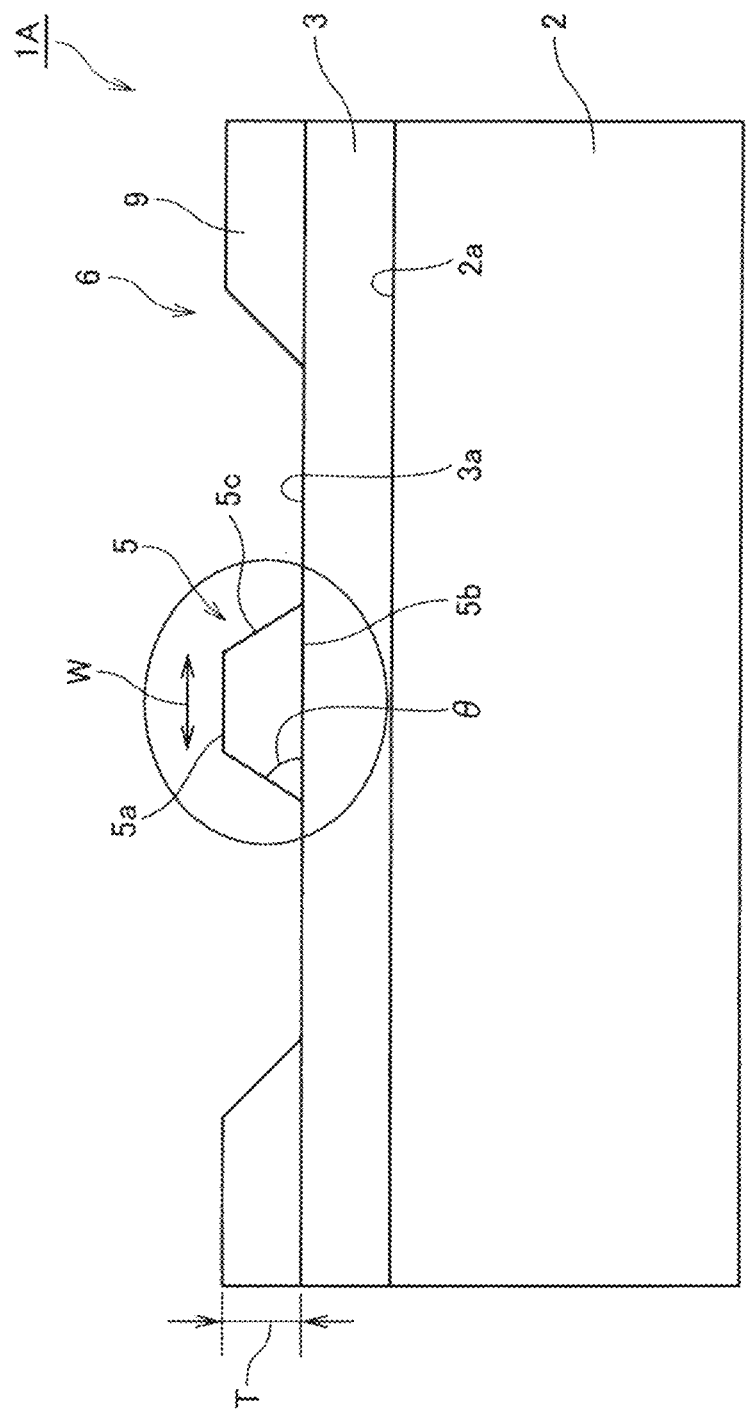
FIG. 2 is a cross sectional view showing an optical waveguide device 1A according to another embodiment.
Figure 4C:
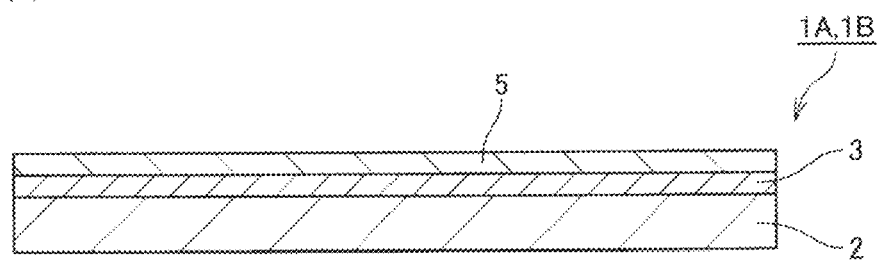
FIG. 4(c) is a longitudinal sectional view showing optical waveguide devices 1A, 1B each cut along a ridge portion.

According to an optical waveguide device 1A shown in FIGS. 2, 4(c) and 6, a thin layer 3 is formed on a surface 2a of a supporting body 2, and a ridge portion 5 made of tantalum pentoxide is formed on the thin layer 3.

A flat upper face 5a and a pair of inclined faces 5c are formed on the ridge portion 5. According to the present example, ridge grooves 6 are formed on both sides of the ridge portion 5, respectively, and the covering portions made of tantalum pentoxide are not formed. The upper face 3a of the thin layer 3 is thus exposed to the ridge grooves 6. Step portions 9 are formed in the outsides of the ridge grooves 6, respectively. According to the present example, the ridge portion 5 and step portions 9 do not form an integrated film and are separated from each other by the ridge grooves 6. Then, as the ridge portion 6 is formed by wet etching and the remaining parts after the etching are not left, the covering portions are not formed.

FIG. 6 is a plan view of the optical waveguide device 1. That is, the ridge grooves 6 are formed on both sides of the ridge portion 5, and the step portions 9 are formed on both sides of the ridge portions 6, respectively. The upper face 3a of the thin layer 3 is exposed to the ridge groove.

Figure 7:
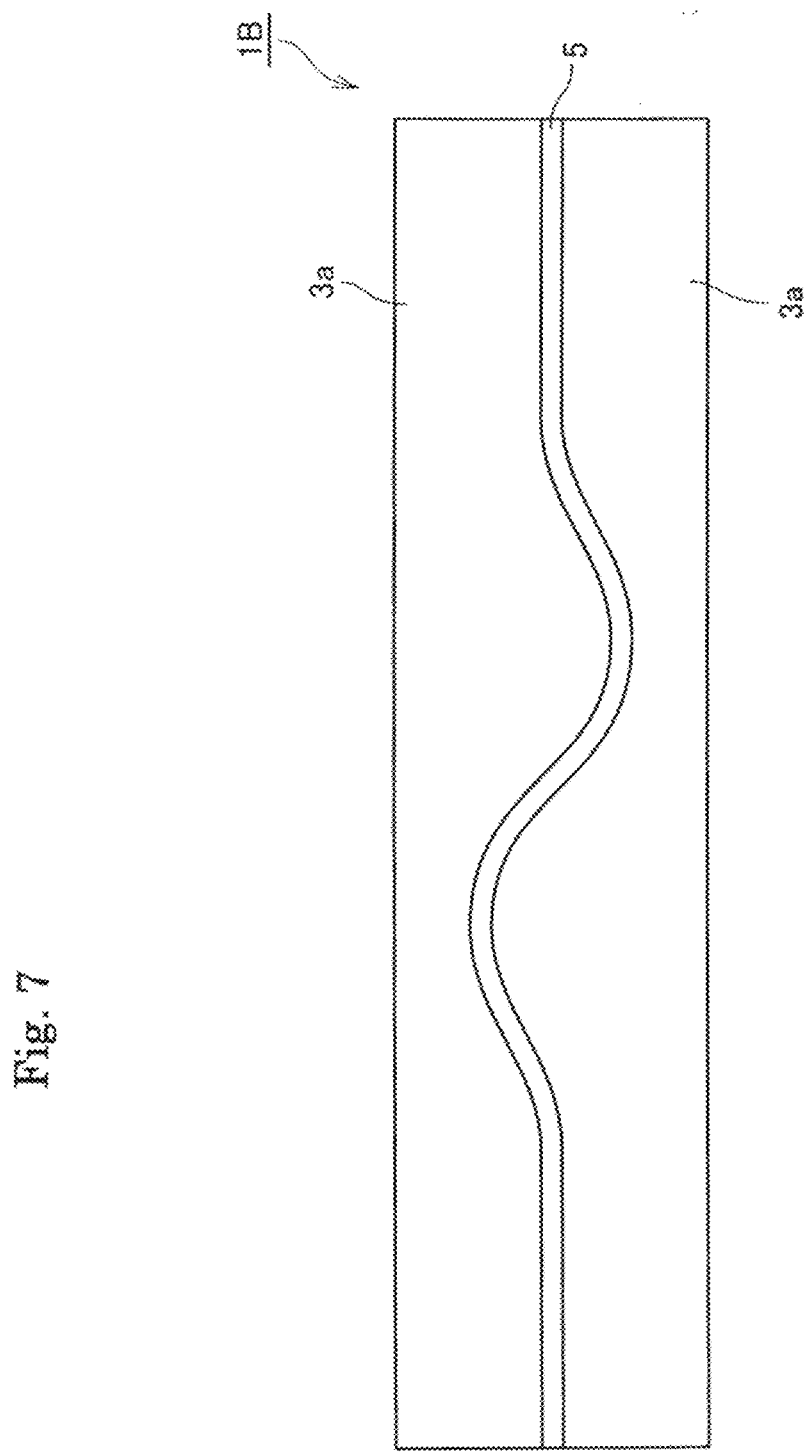
FIG. 7 is a plan view showing an example of pattern of an optical waveguide of the optical waveguide device 1B.

According to an optical waveguide device 1B shown in FIGS. 3, 4(c) and 7, a thin layer 3 is formed on a surface 2a of a supporting body 2, and a ridge portion 5 made of tantalum pentoxide is formed on the thin layer 3.

The flat upper face 5a and a pair of the inclined faces 5c are formed on the ridge portion 5. According to the present example, the film of tantalum pentoxide is not present on the both sides of the ridge portion 5, because the film of tantalum pentoxide is removed by wet etching. The upper face 3a of the thin layer 3 is thus exposed to both sides of the ridge portion 5.

FIG. 7 is a plan view of the optical waveguide device 1. That is, the upper face 3a of the thin layer 3 is exposed to the ridge groove 5.

According to the present invention, the ridge portion is not peeled off from the thin layer by tape peeling test. This means that the peeling is not confirmed by the tape peeling test described in the Example section.

The respective constituents of the present invention will be further described below.

The thin layer 3 is made of an optical material selected from the group consisting of lithium niobate, lithium tantalate, lithium niobate-lithium tantalate, yttrium aluminum garnet, yttrium vanadate, gadolinium vanadate, potassium gadolinium tungstate and potassium yttrium tungstate.

The thin layer made of lithium niobate, lithium tantalate or lithium niobate-lithium tantalate is particularly suitable to a wavelength converting device. Particularly, as lithium tantalate has high transparency and a low absorbance with respect to laser light, its laser processing itself is difficult. The invention is thus particularly useful.

Further in the case that it is used, as a material of the thin layer, yttrium aluminum garnet, yttrium vanadate, gadolinium vanadate, potassium gadolinium tungstate or potassium yttrium tungstate, it is possible to produce a laser part oscillating in 1060 nm band.

The thickness "T" of the thin layer may preferably be 10 µm or smaller and more preferably be 5 µm or smaller, on the viewpoint of confining light to improve the optical conversion efficiency. Further, the thickness of the thin layer may preferably be 1 µm or larger and more preferably 2 µm or larger, on the viewpoint of improving optical connection of the propagation light with another optical part.

In lithium niobate, lithium tantalate and lithium niobate-lithium tantalate mainly used for the wavelength converting device, it may be contained one or more metal element selected from the group consisting of magnesium (Mg), zinc (Zn), scandium (Sc) and indium (In) for further improving the resistance against optical damage of the optical waveguide. A rare earth element may be contained in the thin layer as a dopant. The rare earth element functions as an additive for laser oscillation. Such rare earth element may more preferably be Nd, Er, Tm, Ho, Dy or Pr.

Further, it is usually added a rare earth element such as neodymium (Nd), ytterbium (Yb) or erbium (Er) or the like and a metal such as chromium (Cr), titanium (Ti) or the like to yttrium aluminum garnet, yttrium vanadate, gadolinium vanadate, potassium gadolinium tungstate and potassium yttrium tungstate mainly used for a solid laser. The kind of the added material is selected depending on desired laser wavelength.

The ridge portion loaded on the thin layer is made of tantalum pentoxide. This tantalum pentoxide may contain an additive for obtaining a specific property or an inevitable impurity. Such additive includes, for example, $TiO_2$ for improving the refractive index.

The ridge portion has a trapezoidal shape, provided that the device is cut along a cross section perpendicular to direction of light propagation. It is not necessary that it has a shape of a trapezoid in geometrically strict meaning, and the production error and deviation are permitted. Further, the upper face 5a of the ridge portion 5 is parallel with the upper face 3a of the thin layer 3 in geometrically strict meaning, it is permitted that the upper face 5a of the ridge portion 5 is inclined with respect to the upper face 3a of the thin layer 3 due to the reason of the production.

Figure 8:
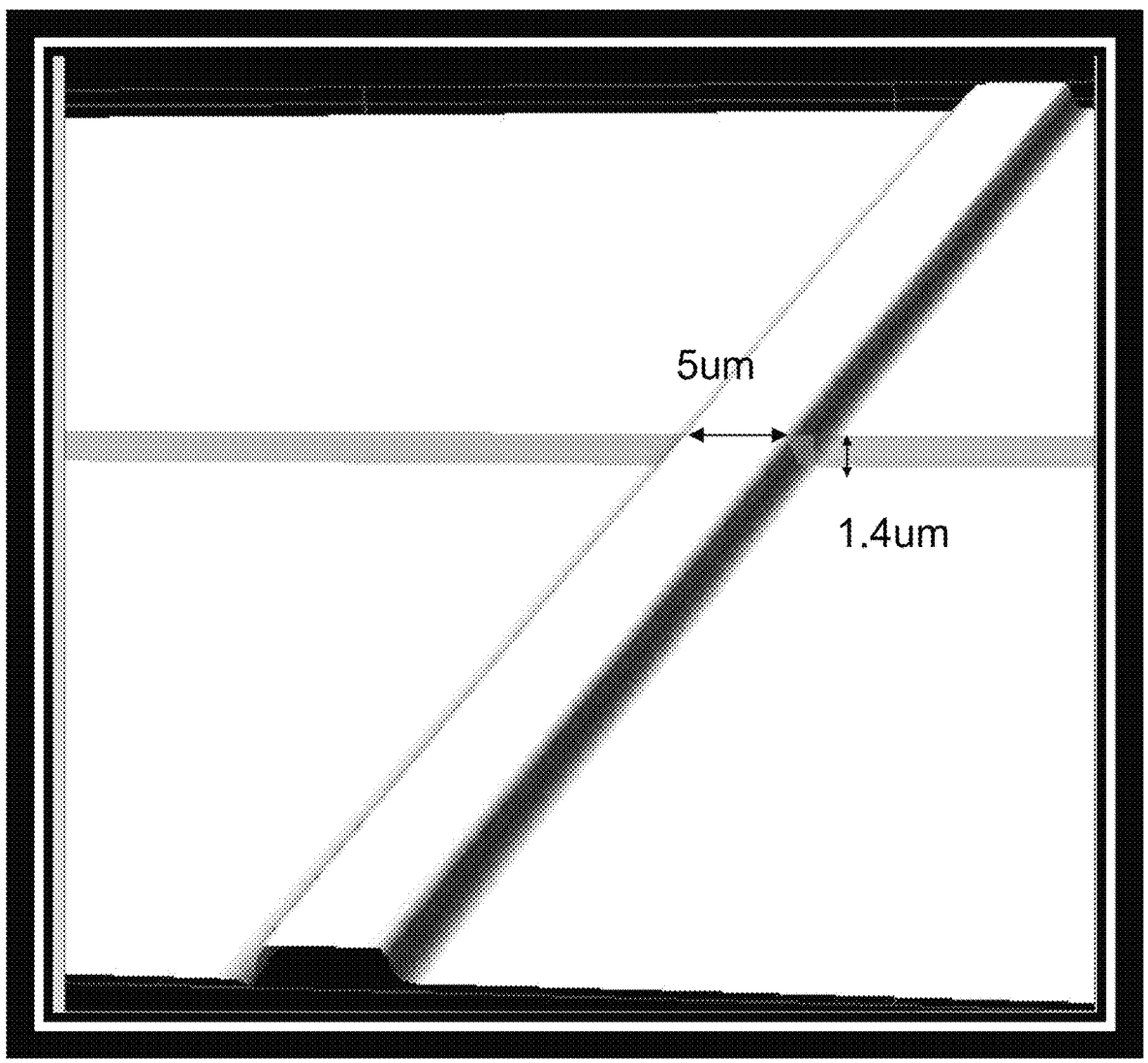
FIG. 8 is a photograph showing an optical waveguide produced in the Example.
Figure 9:
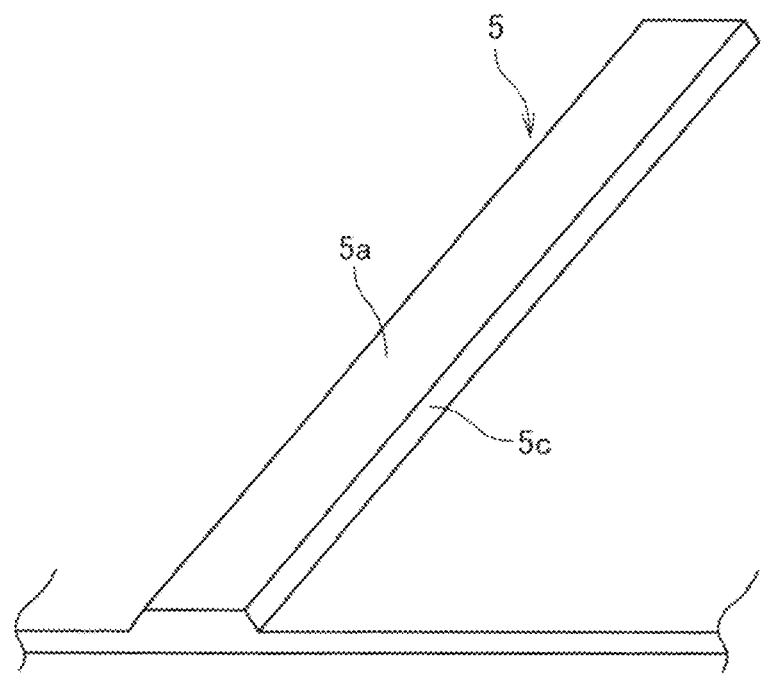
FIG. 9 is a perspective view illustrating the optical waveguide of FIG. 8.

The ridge portion constituting the inventive device has a cross sectional shape of a trapezoid and is elongated in the direction of the propagation of light, as shown in FIG. 8, for example. FIG. 9 illustrates FIG. 8.

According to a preferred embodiment, the ridge portion 5 is formed by wet etching. In this case, the ridge grooves 6 and covering portion 8 shown in FIG. 1 and the ridge groove 6 shown in FIG. 2 may preferably be formed by wet etching. By adjusting the time of wet etching, it is possible to control the residue after the etching in the ridge groove and to select the presence or absence of the covering portion.

Although the etchant used for wet etching is not particularly limited as far as it is capable of etching tantalum pentoxide, an alkali hydroxide such as KOH, NaOH or the like and fluoric acid are preferred.

The temperature during the wet etching may preferably be 25° C. or higher on the viewpoint of productivity, and more preferably be 50° C. or higher on the viewpoint of preventing roughness on the surface.

The wet etching may preferably be performed by photo-lithography method utilizing a mask pattern. The mask pattern may preferably be composed of a single layered film or a multi-layered film of molybdenum, chromium, nickel, gold or platinum. By using such mask pattern, it is possible to produce the curved and branched waveguides shown in FIGS. 6 and 7 and to avoid the deformation of the cross sectional shape of the ridge groove at the same time.

Besides, the ridge portion may be formed by dry etching.

In the case of dry etching, a mask pattern is formed according to similar procedure as that in wet etching. The material of the mask pattern may preferably be titanium or nickel. In the case that titanium is used as the material of the mask, after a resist pattern is produced, the mask pattern may be formed using fluoride-based etching gas. After such mask pattern is formed, the etching is performed using chloride-based gas, fluoride-based gas or mixture of the chloride-based gas and fluoride-based gas under vacuum.

According to a preferred embodiment, a rising angle θ (refer to FIGS. 1, 2 and 3) of the inclined face 5c of the ridge portion 5 is 45° or larger and 80° or smaller, viewed in the cross section perpendicular to the direction of light propagation. The rising angle θ means an angle of the inclined face 5c and upper face 3a of the thin layer 3. It is possible to prevent the roughness of the inclined face and to improve the adhesion of the ridge portion to the thin layer by making the rising angle to 80° or smaller. On the viewpoint, the rising angle θ may more preferably be 70° or smaller. It is possible to further reduce the propagation loss of light, by making the rising angle θ to 45° or larger. On the viewpoint, the rising angle θ may more preferably be 50° or larger.

The width W of the upper face 5a of the ridge portion may preferably be 3 to 8 µm on the viewpoint of improving the confinement of the propagating light and optical connection with another optical part.

The depth D of the ridge groove 6 may preferably be 1 to 3 µm, on the viewpoint of improving the confinement of the propagating light and optical connection with another optical part.

Besides, the preferred ranges of the width W of the upper face 5a of the ridge potion and the depth D of the ridge groove 6 may be changed depending on the wavelength.

According to a preferred embodiment, it is provided a supporting body provided on the opposite side of the ridge portion of the thin layer. The handleability of the thin layer and ridge portion can be thereby improved.

The specific material of the supporting body is not particularly limited, and includes lithium niobate, lithium tantalate, lithium niobate-lithium tantalate, yttrium aluminum garnet, yttrium vanadate, gadolinium vanadate, potassium gadolinium tungstate, potassium yttrium tungstate, a glass such as quartz glass, quartz, Si or the like.

The thin layer 3 may be adhered to the supporting body 2 directly or through the adhesive layer. The material of the adhesive layer may be an inorganic adhesive, an organic adhesive or combination of inorganic and organic adhesives. Further, a clad layer may be provided on each of the upper face and bottom face of the thin layer.

According to a preferred embodiment, the thin layer is exposed to the both sides of the ridge portion, in a cross section perpendicular to the direction of propagation of light. For example, FIGS. 2 and 3 relate to this embodiment. According to the embodiment, the confinement of light in the lateral direction in the ridge portion can be further improved.

Further, according to a preferred embodiment, covering layers of tantalum pentoxide are provided on both sides of the ridge portion, in a cross section perpendicular to the direction of the propagation of light. FIG. 1 relates to this embodiment.

By providing the covering layers made of tantalum pentoxide on both sides of the ridge portion, the direct contact of a solvent for etching tantalum pentoxide with a material for forming the thin layer can be prevented, so that it is possible to form the device with lower damage. Further, the covering layer of tantalum pentoxide functions as a protective film so that the reliability of the device can be improved.

According to a preferred embodiment, a periodic domain inversion structure is formed in the thin layer, so that it is possible to convert the wavelength of light propagating in the device.

The wavelength converting device may preferably be a device of oscillating a high-order harmonic wave such as a second, third or fourth harmonic wave, to which the present invention can be applied in principle. However, the present invention is not limited to such devices and can be applicable to wavelength converting devices such as devices oscillating difference and sum frequencies.

According to a preferred embodiment, a periodic grating structure is formed in the thin layer portion or tantalum pentoxide. Such periodic grating structure can realize a reflecting device having relatively optional reflectivity with respect to a specific frequency. It is thus possible to stabilize the wavelength of a laser at the specific frequency by providing such grating structure.

According to a preferred embodiment, a film of silicon dioxide ($SiO_2$) is formed as a protective film on a surface of tantalum pentoxide.

EXAMPLES

Inventive Example 1

It was produced the device 1 as described in FIGS. 1, 4(a) and 5.

Specifically, it was produced a laminated body including the thin layer 3 of MgO-doped lithium niobate (thickness of 2.0 µm), clad layer of $SiO_2$, adhesive layer and supporting body 2 composed of a Y-cut plate made of non-doped lithium niobate and having a thickness of 0.5 mm. A film of $Ta_2O_5$ with a thickness of 1.5 µm was formed on the thin layer 3 by sputtering.

Then, films of molybdenum each having a thickness of 100 nm were formed on the upper face 3a of the thin layer 3 and bottom face of the supporting body 2, respectively. Then, resist patterns were formed on the thin layer and on the molybdenum film, respectively, by photolithography method (application of the resist and development). Further, the resist was applied onto the whole surface of the bottom face of the supporting body 2. The molybdenum film was then subjected to wet etching to remove the resist and to leave a pattern of the molybdenum film.

Then, the laminated body was immersed in 50% HF at a temperature adjusted at 25° C. for 240 seconds so that tantalum pentoxide was wet etched using the molybdenum film as a mask. It was formed a step having a height of 1.4 µm after the etching. It was obtained an etching rate of 0.35 µm/min. The remaining molybdenum film was then removed by wet etching.

The surface of the thus obtained device was observed by means of a three-dimensional microscope. FIG. 8 shows the observed image. The upper face and side faces of the loaded ridge portion and the bottom face of the etched tantalum pentoxide film were proved to be smooth surfaces. The angle θ of the rising portion of the waveguide was proved to be 70°. The rising angle can be controlled in a range of 45 to 80° by changing the temperature during the etching and concentration of the etchant.

It was formed a periodic domain inversion structure, whose phase matching wavelength is 980 nm, in the thin layer to obtain a second harmonic wave generating device. As the width W of the ridge portion was made 5 µm, the propagation loss was proved to be 0.4 dB/cm with respect to a wavelength of 980 nm.

A tape peeling test was further performed as follows. A tape according to JIS Z1522 standard (width was 15 mm, adhesive force was 8N per a width of 8 mm) was adhered onto the device over a length of 30 mm so as to cover the ridge processed portion, according to JIS H8504 test. At this time, the tape was pushed for more than 10 seconds for avoiding the inclusion of bubbles. The tape was then peeled off vertically over 3 seconds. The adhesion of the film onto the tape and ridge portion were observed by eyes to confirm the presence or absence of the adhesion of the tape onto the film and the peeling of the ridge portion from the device.

As a result, the adhesion of the tape onto the film and the peeling of the ridge portion from the device were not observed.

Comparative Example 1

According to the present example, a loaded portion (ridge portion) made of tantalum pentoxide was produced by lift-off method.

Specifically, it was produced a laminated body including the thin layer 3 of MgO-doped lithium niobate (thickness of 2.0 µm), clad layer of $SiO_2$, adhesive layer and supporting body 2 composed of a Y-cut plate made of non-doped lithium niobate and having a thickness of 0.5 mm. Resist was applied on the thin layer 3 and resist patterns were formed by photolithography method (application of the resist and development). A film of $Ta_2O_5$ with a thickness of 1.5 µm was formed by vapor deposition.

Acetone and pure water were then flown for 10 minutes, respectively, and pure water was flown ultrasonically so that a part of the tantalum pentoxide film except the loaded portion (ridge portion) was peeled off together with the resist film. As a result, the peeling of the ridge portion from the thin layer was observed in about 30 percent of the area of the ridge portion. Further, the tape peeling test was performed to prove that the peeling was observed in about 20 percent of the remaining area of the ridge portion.

The reasons can be speculated as follows. That is, since the loaded ridge portion formed by lift-off method is produced by vapor deposition, the adhesion of it with the surface of the thin layer is poor. Moreover, it is necessary to form the vapor deposition film whose thickness is relatively large for realizing the loading, so that the surface of the substrate is exposed to high temperature of about 150° C. during the deposition of the resist pattern. The components of the resist were thus evaporated to introduce impurities into the interface of the substrate and into the film.

Figure 10:
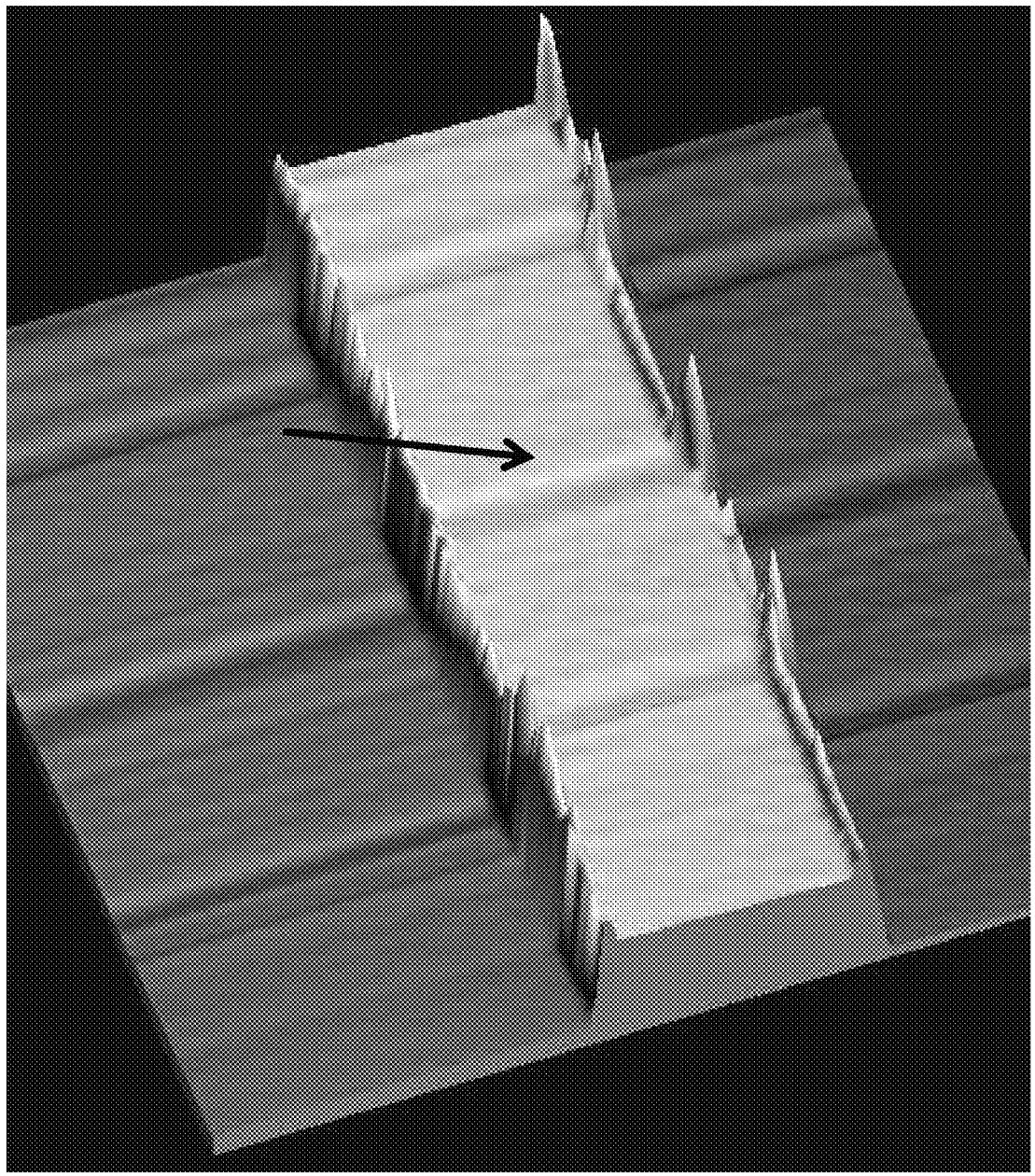
FIG. 10 is a photograph showing an optical waveguide formed by lift-off method.

Moreover, there is a tendency that the cross sectional shape of the loaded ridge portion becomes rectangular whose upper corners are protruded and that the side faces of the ridge portion are roughened. An arrow shown in a photograph of FIG. 10 points the loaded ridge portion. As to the reason, it is not possible to form the resist pattern having a cross sectional shape of a trapezoid. It is further considered that the shape of the resist was deformed due to the above heat to result in the protrusions of the upper corners and the roughening of the side faces of the rectangular ridge portion.

The inventors further studied to produce the resist for the ridge portion having a shape of an overhang (a shape having a small opening having a size of about 0.1 µm at the top)

using benzene or the like. However, according to vapor deposition, materials of $Ta_2O_5$ are supplied perpendicularly onto the waveguide portion without the resist thereon, so that the cross sectional shape of the thus formed loaded portion (ridge portion) cannot be a trapezoid.

Comparative Example 2

It was produced a laminated body including the thin layer 3 of MgO-doped lithium niobate (thickness of 3.5 μm), clad layer of $SiO_2$, adhesive layer and supporting body 2 composed of a Y-cut plate made of non-doped lithium niob ate and having a thickness of 0.5 mm. A pair of ridge grooves were formed in the thin layer 3 to form a ridge type optical waveguide in the thin layer. The ridge grooves were processed by excimer laser.

Figure 11:
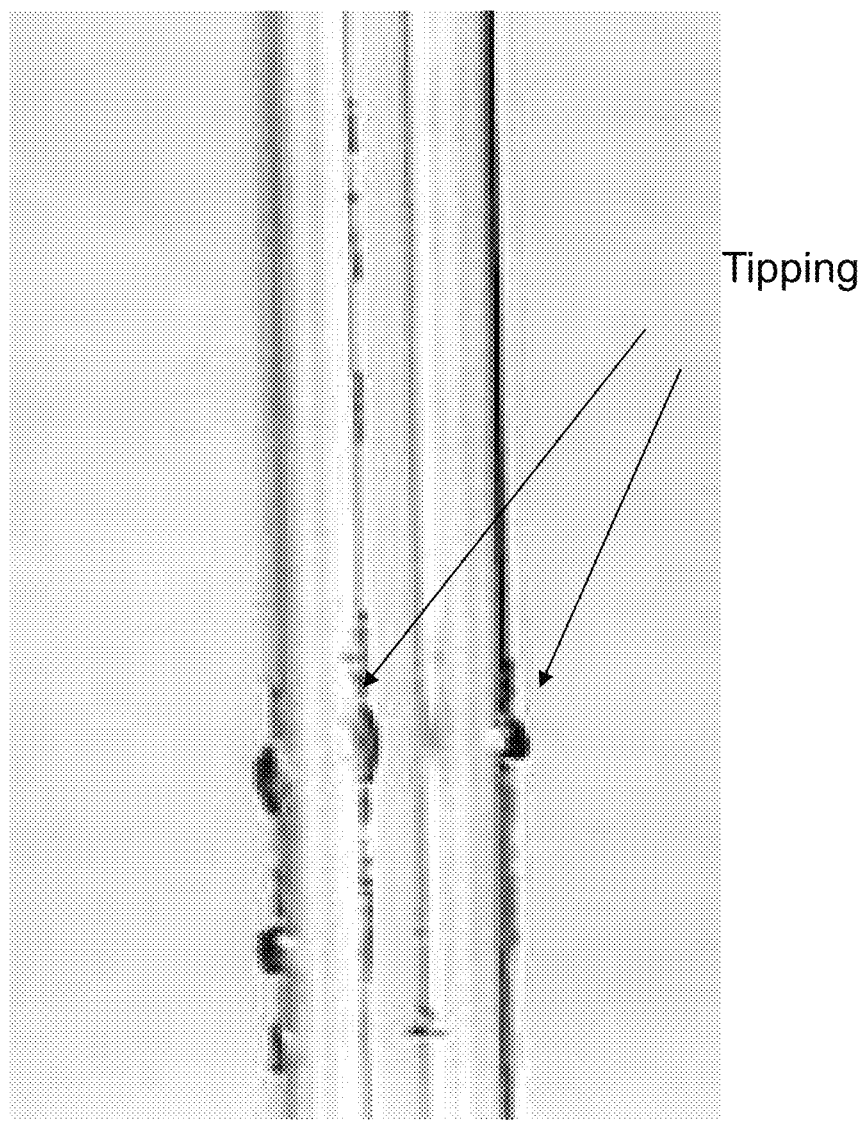
FIG. 11 is a photograph showing a ridge type optical waveguide produced in a thin layer of lithium niobate by laser ablation method.

In the case that the waveguide is formed by excimer laser, tipping may occur at the side wall faces of the ridge portion and the side wall and processed bottom faces of the ridge portion may by roughened, so that the propagation characteristic of the waveguide is deteriorated. FIG. 11 shows the tipping occurred at the side wall of the ridge portion. Further, as most of stages used for the laser processing moves straightforwardly, the pattern obtained by the processing is limited to straight pattern. It is thus difficult to form branched or curved waveguide, limiting applicable devices.

Inventive Example 2

The device was produced as described in the inventive example 1, except that the material of the thin layer 3 was made MgO-doped lithium tantalate single crystal. As a result, it was obtained the similar result as that in the inventive example 1. Further, as the tape peeling test was performed, the adhesion of the tape onto the film and the peeling of the ridge portion from the device were not observed.

Inventive Example 3

The device was produced as described in the inventive example 1, except that the material of the thin layer 3 was made yttrium vanadate crystal. For confirming the properties of the optical waveguide, the propagation loss was measured at a wavelength of 980 nm as the inventive example 1 to obtain a value of 0.5 dB/cm. Further, as the tape peeling test was performed, the adhesion of the tape onto the film and the peeling of the ridge portion from the device were not observed.

The invention claimed is:

1. An optical waveguide device comprising;
a thin layer consisting of an optical material selected from the group consisting of lithium niobate, lithium tantalate, and lithium niobate-lithium tantalate, wherein said optical material is optionally doped with a metal element or a rare earth element; and
a ridge portion loaded directly on said thin layer, said ridge portion comprising tantalum pentoxide and having a trapezoidal shape viewed in a cross section perpendicular to a direction of propagation of a light, wherein said ridge portion directly contacts said optical material; and
wherein said light is confined to and propagates in said thin layer under said ridge portion.

2. The device of claim 1, wherein said ridge portion comprises an inclined face having a rising angle of 45° or larger and 80° or smaller viewed in said cross section perpendicular to said direction of propagation of light.

3. The device of claim 1, further comprising a supporting body provided on a first side of said thin layer, said first side being opposite to a second side of said thin layer on which said ridge portion is loaded.

4. The device of claim 1, wherein said thin layer is exposed to both sides of said ridge portion viewed in said cross section perpendicular to said direction of propagation of light.

5. The device of claim 1, further comprising covering layers on both sides of said ridge portion viewed in said cross section perpendicular to said direction of propagation of light.

6. The device of claim 1, further comprising a periodic domain inversion structure formed in said thin layer.

7. The device of claim 1, further comprising a silicon dioxide film at least on said ridge portion.

8. The device of claim 1, wherein said ridge portion is formed by wet etching.

9. A method of producing an optical waveguide, comprising the steps of:
providing a thin layer consisting of an optical material selected from the group consisting of lithium niobate, lithium tantalate, and lithium niobate-lithium tantalate, said optical material optionally doped with a metal element or a rare earth element; and
providing a ridge portion on said thin layer by wet etching, said ridge portion comprising tantalum pentoxide and having a trapezoidal shape viewed in a cross section perpendicular to a direction of propagation of light, wherein said ridge portion directly contacts said optical material; and
wherein said light is confined to and propagates in said thin layer under said ridge portion.

10. The method of claim 9, wherein said ridge portion comprises an inclined face having a rising angle of 45° or larger and 80° or smaller viewed in said cross section perpendicular to said direction of propagation of light.

11. The method of claim 9, further comprising the step of providing said thin layer on a supporting body before providing said ridge portion on said thin layer.

12. The method of claim 9, further comprising the step of providing covering layers on both sides of said ridge portion viewed in said cross section perpendicular to said direction of propagation of light.

13. The method of claim 9, further comprising the step of providing a periodic domain inversion structure in said thin layer.

14. The method of claim 9, further comprising the step of providing a silicon dioxide film on said ridge portion.

15. The device of claim 1, wherein said optical material is doped with said metal element or said rare earth element.

16. The device of claim 1, wherein said optical material is selected from the group consisting of lithium niobate and lithium tantalate.

17. The method of claim 9, wherein said optical material is selected from the group consisting of lithium niobate and lithium tantalate.

* * * * *